United States Patent [19]

Schaetzer et al.

[11] 4,396,393
[45] Aug. 2, 1983

[54] DYE MIXTURES AND THEIR USE

[75] Inventors: Harry Schaetzer, Wehr, Fed. Rep. of Germany; Helmut Raisin, Riehen; Dieter Mäusezahl, Biel-Benken, both of Switzerland

[73] Assignee: Ciba-Geigy Corporation, Ardsley, N.Y.

[21] Appl. No.: 346,979

[22] Filed: Feb. 8, 1982

[30] Foreign Application Priority Data

Dec. 29, 1981 [CH] Switzerland ................ 8329/81
Dec. 29, 1981 [CH] Switzerland ................ 8330/81

[51] Int. Cl.³ ............................................. C09B 1/00
[52] U.S. Cl. ................................... 8/643; 8/676; 8/679; 8/917; 8/924
[58] Field of Search .......................... 8/643, 917, 924

[56] References Cited

U.S. PATENT DOCUMENTS 3,778,453 12/1973 Hindermann et al. ............ 544/156
4,146,363 3/1979 Harms et al. .................... 8/643
4,260,389 4/1981 Lister ............................. 8/491.1

FOREIGN PATENT DOCUMENTS 42357 12/1981 European Pat. Off. .
538310 11/1931 Fed. Rep. of Germany .
945643 7/1956 Fed. Rep. of Germany .

Primary Examiner—A. Lionel Clingman
Attorney, Agent, or Firm—Edward McC. Roberts

[57] ABSTRACT

The invention relates to a dye mixture which contains a dye of the formula

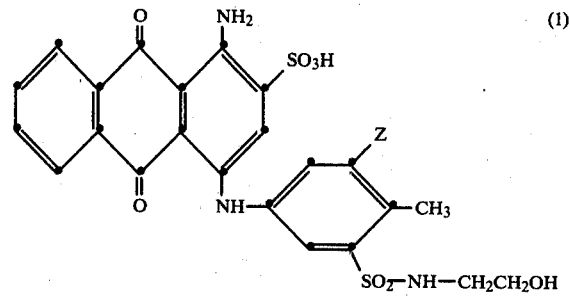

wherein Z is hydrogen or methyl, and a dye of the formula

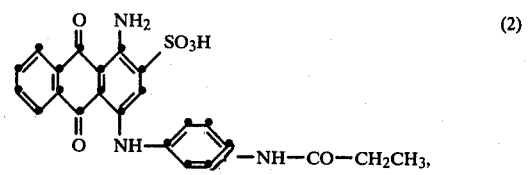

Z in the formula (1) being hydrogen when the propionylamino group in the formula (2) is bound in the m-position with respect to the NH group. The dye mixture is suitable for dyeing or printing natural or synthetic polyamide materials, especially in combination with other dyes, and particularly from short liquors. The dye mixture is characterized by generally good properties, in particular by good strike properties and good solubility.

14 Claims, No Drawings

DYE MIXTURES AND THEIR USE

It was the object of the present invention to provide anthraquinone dyes or dye mixtures which would be suitable for dyeing natural or synthetic polyamide materials from an aqueous bath, which would have very good fastness properties, particularly fastness to light, and which would exhibit, especially in combination with other dyes, good strike properties, in particular from short liquors.

It has now been found that the dye mixture of dyes of the formulae (1) and (2) satisfies the stated requirements.

The present invention thus relates to a dye mixture which contains a dye of the formula

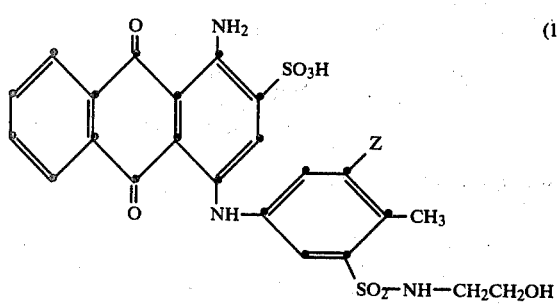

wherein Z is hydrogen or methyl, and a dye of the formula

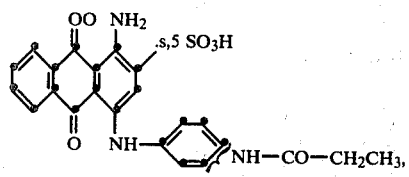

Z in the formula (1) being hydrogen when the propionylamino group in the formula (2) is bound in the m-position with respect to the NH group. The dye mixture according to the invention can therefore contain a dye of the formula

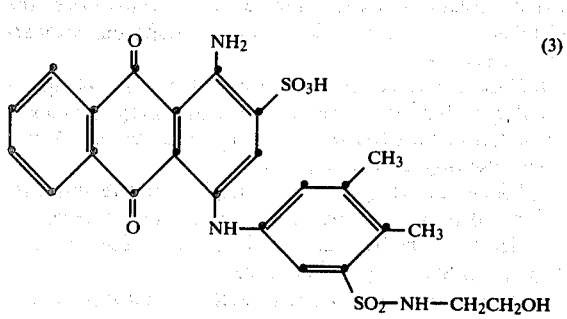

and a dye of the formula

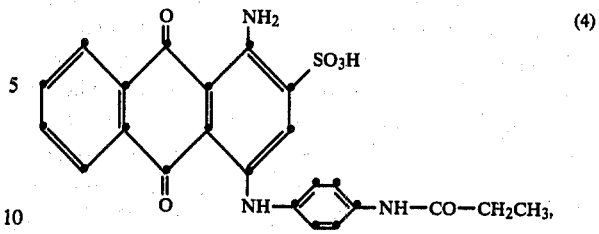

or a dye of the formula

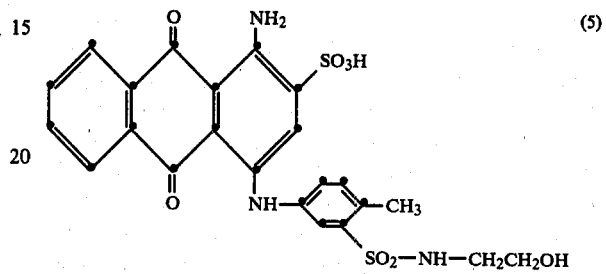

and a dye of the formula (2), an applicable dye as dye of the formula (2) being the dye of the formula (4) or the dye of the formula

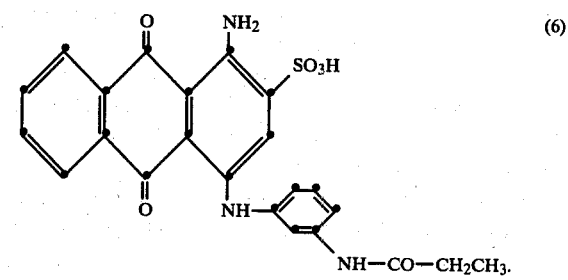

In the dye mixtures according to the invention, the preferred ratio between the dyes of the formulae (1) and (2), (3) and (4), (5) and (2), (5) and (4) or (5) and (6) is 20:80 to 80:20; and in particular the ratio between the dyes of the formulae (3) and (4), (5) and (4) or (5) and (6) is preferably 40:60 to 60:40. The ratio between the dyes of the formulae (3) and (4) or (5) and (4) of 50:50 to 60:40 and particularly of 55:45 to 57:43 and between the dyes of the formulae (5) and (6) of 50:50 to 60:40 and in particular of 52:48 is more especially preferred.

The anthraquinone dyes of the formulae (3), (4), (5) and (6) are known. Thus, the dyes of the formulae (3) and (5) can be produced in a manner analogous to that described in the U.S. Pat. No. 3,778,453, and the dye of the formula (4) in a manner analogous to that given in the German Pat. specification No. 945,643. The dye of the formula (6) can be produced, using a process analogous to that described in the German Pat. specification No. 538,310, by using propionyl chloride in place of chloroacetyl chloride.

The dye mixture according to the invention can be produced by mixing the individual dyes together. This mixing process is carried out for example in suitable mills, for example in ball and dowelled-disc mills, and also in kneaders or mixers. Furthermore, the dye mixtures can be produced by spray drying of the aqueous dye mixtures.

Further subject matter of the present invention is a process for dyeing and printing natural or synthetic polyamide materials with a dye mixture containing the dyes of the formulae (1) and (2) or (3) and (4), (5) and (4) or (5) and (6). Suitable synthetic polyamide materials are for example nylon or Perlon; and a suitable natural polyamide material is for example wool. The customary dyeing and printing processes are used for dyeing or printing the materials.

The dye mixture containing the dyes of the formulae (1) and (2) or (3) and (4), (5) and (4) or (5) and (6) is particularly suitable for dyeing and printing in combination with other dyes, and especially for dyeing and printing according to the trichromatic principle. By this is meant the additive dye mixture of three suitably selected yellow-, red- and blue-dyeing dyes in the amounts necessary to produce the desired shade. The dye mixture according to the invention is suitable in particular for dyeing from short liquors, for example in the continuous dyeing process, or discontinuous and continuous froth dyeing processes.

The dye mixture according to the invention is characterised by generally good properties, for example by good solubility and stability to cold dissolving, by good strike properties and, in particular, by its suitability for being combined with other dyes.

The textile material to be dyed or printed can be in various stages of processing: it can be for example in the form of fibres, yarns, fabrics or knitted goods, and especially in the form of carpets.

In the dye mixture according to the invention, the dyes of the formulae (1) and (2) or (3) and (4), (5) and (4) or (5) and (6) are either in the form of their free sulfonic acid or preferably in the form of salts thereof, for example the alkali metal, alkaline-earth metal or ammonium salts, or they are in the form of salts of an organic amine. Examples which may be mentioned are the sodium, lithium or ammonium salts, or the salt of triethanolamine.

The dye mixture contains as a rule further additives, for example sodium chloride or dextrin.

The dye liquors or printing pastes can also contain further additives, for example wetting agents, antifoaming agents, levelling agents or agents affecting the properties of the textile material, for example softening agents, additives for imparting a fireproof finish, or dirt-, water- and oil-repelling agents, as well as water-softening agents and natural or synthetic thickeners, for example alginates and cellulose ethers.

The term 'parts' in the following Examples denotes parts by weight, and temperature values are given in degrees Centigrade. The relationship between parts by weight and parts by volume is the same as that between gram and cubic centimeter.

EXAMPLE 1

To produce the dye mixture containing a dye of the formula

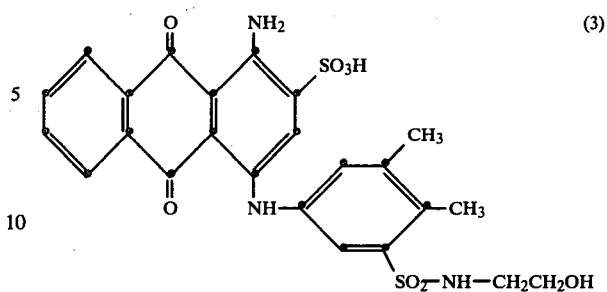

or a dye of the formula

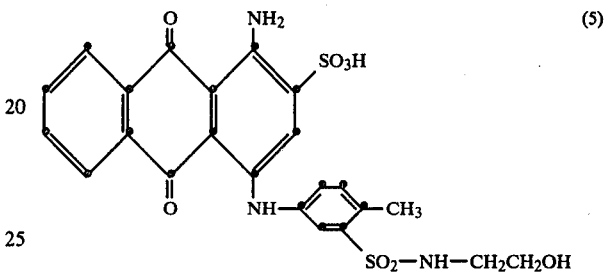

and a dye of the formula

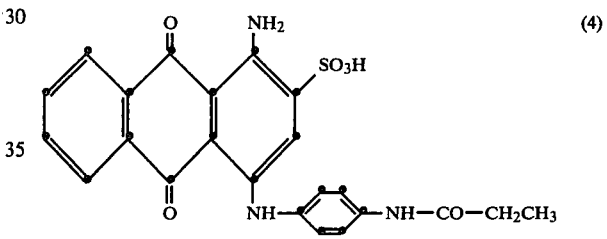

or a dye of the formula

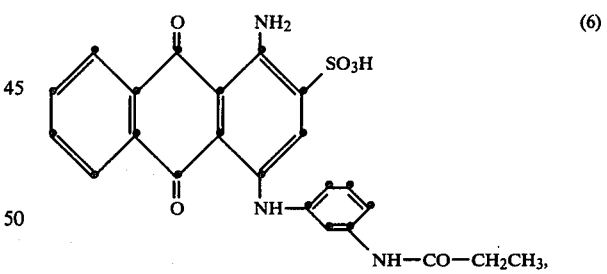

with the exception of the combination of the dyes of the formulae (3) and (6), the following operations are carried out in a mixer:

(a) 30.2 parts of the dye of the formula (3) and 69.8 parts of the dye of the formula (4) are homogeneously mixed to obtain 100 parts of the mixture denoted in the following as dye mixture A;

(b) 56.6 parts of the dye of the formula (3) and 43.4 parts of the dye of the formula (4) are homogeneously mixed to obtain 100 parts of the mixture denoted in the following as dye mixture B;

(c) 79.6 parts of the dye of the formula (3) and 20.4 parts of the dye of the formula (4) are homogeneously mixed to obtain 100 parts of the mixture denoted in the following as dye mixture C;

(d) 30.2 parts of the dye of the formula (5) and 69.8 parts of the dye of the formula (4) are homogeneously mixed to obtain 100 parts of the mixture denoted in the following as dye mixture D;

(e) 56.6 parts of the dye of the formula (5) and 43.4 parts of the dye of the formula (4) are homogeneously mixed to obtain 100 parts of the mixture denoted in the following as dye mixture E;

(f) 79.6 parts of the dye of the formula (5) and 20.4 parts of the dye of the formula (4) are homogeneously mixed to obtain 100 parts of the mixture denoted in the following as dye mixture F;

(g) 26.6 parts of the dye of the formula (5) and 73.4 parts of the dye of the formula (6) are homogeneously mixed to obtain 100 parts of the mixture denoted in the following as dye mixture G;

(h) 52 parts of the dye of the formula (5) and 48 parts of the dye of the formula (6) are homogeneously mixed to obtain 100 parts of the mixture denoted in the following as dye mixture H; and (i) 76.5 parts of the dye of the formula (5) and 23.5 parts of the dye of the formula (6) are homogeneously mixed to obtain 100 parts of the mixture denoted in the following as dye mixture J.

EXAMPLE 2

10 parts of Helanca tricot are dyed in 500 parts of an aqueous liquor containing per liter 2 g of ammonium acetate, the pH value having been set to 5 with acetic acid. The dyes used are 0.27% of the yellow dye of the formula

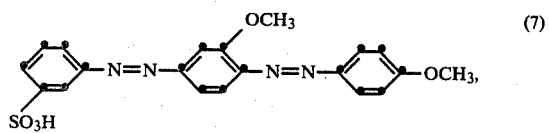
(7)

0.12% of the red dye of the formula

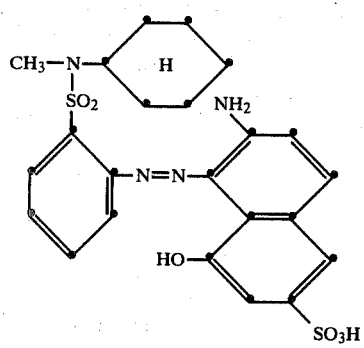
(8)

and 0.13% of the blue dye mixture B obtained according to Example (1b), the percentage amounts being relative to the weight of fibre. The dyeing time at a temperature of 60° to 98° C. is 30 to 90 minutes. The dyed Helanca piece is subsequently removed and is rinsed and dried in the usual manner. The fabric piece obtained is completely evenly dyed in a neutral brown shade and exhibits no sign at all of streakiness induced by the material.

By using, instead of 0.27% of the yellow dye of the formula (7) and 0.12% of the red dye of the formula (8) with 0.13% of the blue dye mixture B, the dyes of the formulae (7) and (8) together with the dye mixtures from Example 1 which are given in the following Table 1, there are obtained fabric pieces completely evenly dyed in the shades indicated.

TABLE 1

| Example | Dyes used | Shade |
|---|---|---|
| 3 | 0.18% of the dye of formula (7) 0.18% of the dye of formula (8) 0.077% of the dye of mixture C | reddish-brown |
| 4 | 0.25% of the dye of formula (7) 0.04% of the dye of formula (8) 0.14% of the dye mixture A | olive |
| 5 | 0.27% of the dye of formula (7) 0.12% of the dye of formula (8) 0.13% of the dye mixture H | neutral brown |
| 6 | 0.18% of the dye of formula (7) 0.17% of the dye of formula (8) 0.07% of the dye mixture J | reddish brown |
| 7 | 0.25% of the dye of formula (7) 0.036% of the dye of formula (8) 0.124% of the dye mixture G | olive |
| 8 | 0.29% of the dye of formula (7) 0.13% of the dye of formula (8) 0.13% of the dye mixture E | neutral brown |
| 9 | 0.18% of the dye of formula (7) 0.18% of the dye of formula (8) 0.077% of the dye mixture F | reddish-brown |
| 10 | 0.25% of the dye of formula (7) 0.04% of the dye of formula (8) 0.14% of the dye mixture D | olive |

EXAMPLE 11

10 parts of Helanca tricot are dyed in 500 parts of an aqueous liquor containing per liter 2 g of ammonium acetate, the pH-value of the liquor having been adjusted to 5 with acetic acid. The proportion of the dye mixture B, E or G is 0.9%, relative to the weight of the fibre. The dyeing time at a temperature of 98° C. is 30 to 90 minutes. The dyed Helanca piece is subsequently removed and is rinsed and dried in the customary manner. With dye mixture B or E is obtained a fabric piece evenly dyed in a greenish-blue shade, and with the dye mixture G a fabric piece evenly dyed in a reddish-blue shade, the fabric in all cases exhibiting no sign at all of streakiness induced by the material.

EXAMPLE 12

10 parts of polyamide 66 yarn are dyed in 400 parts of an aqueous liquor containing per liter 1.5 g of ammonium acetate, the pH-value of the liquor having been adjusted to 5.5 with acetic acid. As dyes are used 0.27% of the dye of the formula (7), 0.12% of the dye of the formula (8) and 0.13% of the dye mixture B obtained according to Example (1b), the percentage amounts being relative to the weight of fibre. The dye bath is heated within 30 minutes to 98° C. and is held for 60 minutes at 96° to 98° C. The dyed yarn is subsequently removed, and is rinsed and dried in the customary manner. The result is a yarn dyed in a neutral brown shade.

By using, instead of 0.27% of the yellow dye of the formula (7) and 0.12% of the red dye of the formula (8) with 0.13% of the blue dye mixture B, the dyes of the formulae (7) and (8) together with the dye mixtures from Example 1 which are given in the following Table 2, there is obtained yarn dyed in the shades listed in the Table.

TABLE 2

| Example | Dyes used | Shade |
|---|---|---|
| 13 | 0.18% of the dye of the formula (7) | reddish- |

TABLE 2-continued

| Example | Dyes used | Shade |
|---|---|---|
| | 0.18% of the dye of the formula (8) | brown |
| | 0.077% of the dye mixture C | |
| 14 | 0.25% of the dye of the formula (7) | olive |
| | 0.04% of the dye of the formula (8) | |
| | 0.14% of the dye mixture A | |
| 15 | 0.27% of the dye of the formula (7) | neutral |
| | 0.12% of the dye of the formula (8) | brown |
| | 0.13% of the dye mixture H | |
| 16 | 0.18% of the dye of the formula (7) | reddish- |
| | 0.17% of the dye of the formula (8) | brown |
| | 0.07% of the dye mixture J | |
| 17 | 0.25% of the dye of the formula (7) | olive |
| | 0.036% of the dye of the formula (8) | |
| | 0.124% of the dye mixture G | |
| 18 | 0.29% of the dye of the formula (7) | neutral |
| | 0.13% of the dye of the formula (8) | brown |
| | 0.13% of the dye mixture E | |
| 19 | 0.18% of the dye of the formula (7) | reddish- |
| | 0.18% of the dye of the formula (8) | brown |
| | 0.077% of the dye mixture F | |
| 20 | 0.25% of the dye of the formula (7) | olive |
| | 0.04% of the dye of the formula (8) | |
| | 0.14% of the dye mixture D | |

By using moreover, in place of the yellow dye of the formula (7), the orange dye of the formula

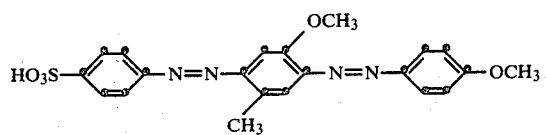

(9)

together with the red dye of the formula (8) and the respective dye mixtures from Example 1, there are obtained, with the dyes given in the following Table 3, the yarn dyed in the shades indicated in the Table.

TABLE 3

| Example | Dyes used | Shade |
|---|---|---|
| 21 | 0.27% of the dye of formula (9) | neutral |
| | 0.1% of the dye of formula (8) | brown |
| | 0.14% of the dye of mixture B | |
| 22 | 0.18% of the dye of formula (9) | reddish- |
| | 0.12% of the dye of formula (8) | brown |
| | 0.09% of the dye mixture C | |
| 23 | 0.25% of the dye of formula (9) | olive |
| | 0.03% of the dye of formula (8) | |
| | 0.16% of the dye mixture A | |
| 24 | 0.27% of the dye of formula (9) | neutral |
| | 0.09% of the dye of formula (8) | brown |
| | 0.14% of the dye mixture H | |
| 25 | 0.18% of the dye of formula (9) | reddish- |
| | 0.11% of the dye of formula (8) | brown |
| | 0.09% of the dye mixture J | |
| 26 | 0.25% of the dye of formula (9) | olive |
| | 0.02% of the dye of formula (8) | |
| | 0.14% of the dye mixture G | |
| 27 | 0.27% of the dye of formula (9) | neutral |
| | 0.1% of the dye of formula (8) | brown |
| | 0.14% of the dye mixture E | |
| 28 | 0.18% of the dye of formula (9) | reddish- |
| | 0.12% of the dye of formula (8) | brown |
| | 0.09% of the dye mixture F | |
| 29 | 0.25% of the dye of formula (9) | olive |
| | 0.03% of the dye of formula (8) | |
| | 0.16% of the dye mixture D | |

EXAMPLE 30

(Carpet exhaust process):

A beam dyeing apparatus (laboratory piece-dyeing apparatus, Model 10, supplier Rudolf Then) consists principally of a horizontal dyeing vessel fitted with a cooling jacket, and a secondary vessel with a special circulating pump, and the two vessels are connected together to form a circulation system. Into this dyeing apparatus is introduced a cloth beam loaded with a polyamide-6 uncut pile carpet piece, which is 50 cm wide, 135 cm long and weighs 380 g. Six liters of softened water are then fed into the secondary vessel and 60 ml of 2 N sodium hydroxide solution are added. When the corresponding valves (secondary vessel, and connecting pipes, pump/dyeing vessel) are opened, the liquor flows under its own head into the dyeing vessel, the displaced air then passing through the vent pipe into the secondary vessel. After the dyeing apparatus has been filled, a residue of liquor about 5 cm deep remains in the secondary vessel, and the circulating pump is then switched on. For checking the pH-value, a drilled hole is located in the pipe line between the dyeing vessel and secondary vessel (flow direction), and a combined glass electrode is inserted. The dye liquor circulates from the inside to the outside during the entire dyeing process, the pressure gradient being 0.1 to 0.2 bar, and the delivery of the pump about 6 liters per minute. The liquor is heated to 98° C. and 7.6 g of an anionic levelling agent, which has affinity for the fibres and is dissolved in 100 ml of water, are introduced within 5 minutes into the secondary vessel. The dyeing temperature is adjusted to 97° to 98° C. and the pH-value is 10.7. The pH-value of a specimen taken out and cooled to 20° C. is 11.9.

There are then fed from a dropping funnel into the secondary vessel, within 10 minutes, 2.5 g of the yellow dye of the formula (7) of Example 2, and 1.8 g of the blue dye mixture C of Example 1, both dissolved in 200 ml of hot water. After 30 minutes is added, by means of a plunger burette, a total amount of 100 ml of 1 N sulfuric acid, for 10 minutes at a rate of 5.5 ml per minute and for a further 20 minutes at a rate of 2.25 ml per minute. The pH-value after a further 10 minutes is 3.8. The dye bath is exhausted, that is to say, the dyes have been absorbed to the extent of 99% onto the dyed material. Heating is switched off, and the temperature is lowered to 60° C. with the aid of indirect cooling. The pH-value during this time rises to 3.9. The liquor, which is almost as clear as water, is pumped back into the secondary vessel and the cloth beam is removed. The carpet material is unrolled, centrifuged and dried. The polyamide uncut pile carpet material is dyed evenly green over the whole surface.

By using, instead of 1.8 g of the blue dye mixture C, 1.8 g of the blue dye mixture F, with otherwise the same procedure, there is likewise obtained a polyamide uncut pile carpet material dyed evenly green over the whole surface.

EXAMPLE 31

(Carpet printing)

A velvet pile carpeting piece made from polyamide 6 weighing 350 to 400 g/m² is impregnated, on a padding machine, with a padding liquor consisting of 988 parts of water, 10 parts of sodium hydroxide solution 36° Be and 2 parts of a wetting agent, and the material is afterwards squeezed out to give a liquor absorption of 80%.

There is then sprayed onto the pretreated carpet material, by means of a nozzle, in the form of a pattern a printing paste of the following composition:
  942 parts of water,
  50 parts of a thickener,
  3 parts of an antifoaming agent,
  3 parts of the yellow dye of the formula (7) of Example 2,
  1 part of the red dye of the formula (8) of Example 2, and
  1 part of the blue dye mixture A of Example 1, or
  1 part of the blue dye mixture D of Example 1.

The employed thickener has the following composition:
  240 parts of white spirit,
  50 parts of a water-in-oil emulsifier,
  20 parts of an oil-in-water emulsifier,
  20 parts of an antifoaming agent,
  50 parts of a crosslinked carboxyvinyl polyvinyl polymer having a molecular weight of about 4,000,000,
  70 parts of a linear carboxyvinyl polymer having a molecular weight of about 1,000,000, and
  550 parts of water, the pH-value of which has been adjusted to 4.5 with acetic acid.

The material sprayed with printing ink is subsequently treated for 5 minutes with saturated steam at 101° C. to fix the dyes; it is then rinsed, neutralised, rinsed again and dried.

The velvet pile carpeting piece obtained displays a sharply outlined brown pattern which has very good penetration and shows no signs at all of "frosting".

When one part of the blue dye mixture G of Example 1 is used instead of one part of the blue dye mixture A or D of Example 1, the procedure otherwise being the same, a velvet pile carpeting piece displaying a brown pattern and having similarly good properties is obtained.

EXAMPLE 32

(Carpet continuous dyeing)

4.5 parts of the yellow dye of the formula (7) of Example 2 and 1.5 parts of the blue dye mixture B of Example 1 are dissolved in 100 parts of water by brief boiling. This solution is then added to a solution containing 3 parts of a thickener based on locust bean flour, 5.0 parts of a coacervate-forming padding auxiliary based on a condensation product of a higher molecular fatty acid with an oxyalkylamine, 2.0 parts of cryst. monosodium phosphate and 1.0 part of cryst. disodium phosphate in 500 parts of cold water. The solution is subsequently made up with cold water to 1000 parts. Of this liquor having a pH-value of 5.5 to 6.5, 300%, relative to the weight of carpet, is applied to a polyamide-6.6 tufted crude carpet at a carpet speed of 8 meters per minute. The impregnated carpet passes into a loop steamer, where it is treated for 10 minutes with saturated steam at 98° to 100° C. The result after washing in a full width washing machine is a carpet material evenly dyed in a green shade.

By using, instead of 4.5 parts of the yellow dye of the formula (7) and 1.5 parts of the blue dye mixture B, the dyes and dye mixtures listed in the following Table 4, there are obtained carpets evenly dyed in the given shades.

TABLE 4

| Example | Dyes used | Shade |
|---|---|---|
| 33 | 2.7 parts of the dye of formula (7) | neutral |
|  | 1.2 parts of the dye of formula (8) | brown |
|  | 1.3 parts of the dye mixture B |  |
| 34 | 2.4 parts of the dye of formula (7) | reddish- |
|  | 2.3 parts of the dye of formula (8) | brown |
|  | 1.0 part of the dye mixture B |  |
| 35 | 3.0 parts of the dye of formula (7) | olive |
|  | 0.4 part of the dye of formula (8) |  |
|  | 1.2 parts of the dye mixture B |  |
| 36 | 4.5 parts of the dye formula (7) | green |
|  | 1.5 parts of the dye mixture E |  |
| 37 | 2.7 parts of the dye of formula (7) | neutral |
|  | 1.2 parts of the dye of formula (8) | brown |
|  | 1.3 parts of the dye mixture E |  |
| 38 | 2.4 parts of the dye of formula (7) | reddish- |
|  | 2.3 parts of the dye of formula (8) | brown |
|  | 1.0 part of the dye mixture E |  |
| 39 | 3.0 parts of the dye of formula (7) | olive |
|  | 0.4 part of the dye of formula (8) |  |
|  | 1.2 parts of the dye mixture E |  |
| 40 | 2.7 parts of the dye of formula (7) | neutral |
|  | 1.2 parts of the dye of formula (8) | brown |
|  | 1.3 parts of the dye mixture H |  |
| 41 | 2.4 parts of the dye of formula (7) | reddish- |
|  | 2.3 parts of the dye of formula (8) | brown |
|  | 1.0 part of the dye mixture H |  |
| 42 | 3.0 parts of the dye of formula (7) | olive |
|  | 0.4 part of the dye of formula (8) |  |
|  | 1.2 parts of the dye mixture H |  |

EXAMPLE 43

(Wool continuous dyeing)

A wool material is padded with a liquor containing 2.6 parts of the yellow dye of the formula (7), 5.2 parts of the red dye of the formula (8), 15.7 parts of the blue dye mixture B, 2.0 parts of a thickener based on alginate, 22.0 parts of a coacervate-forming padding auxiliary based on a condensation product of a higher molecular fatty acid with an oxyalkylamine and 8.0 parts of 80% formic acid in 1000 parts of water, a liquor absorption of 85%, relative to the weight of wool, being obtained. The material is subsequently steamed for 15 minutes in saturated steam at 98° to 100° C. and is then washed. The result is an even olive dyeing.

When 15.7 parts of the blue dye mixture E or H are used in place of 15.7 parts of the blue dye mixture B, with otherwise the same procedure, there is likewise obtained wool evenly dyed in an olive shade.

EXAMPLE 44

500 m² of a polyamide(6.6) cut pile carpet (velvet pile material with polypropylene ribbon backing) having a weight per square meter of 535 g are continuously wetted in a liquor containing per liter 1 g of the reaction product of 1 mol of nonylphenol and 9 mols of ethylene oxide, and the material is then subjected to suction to give a liquor absorption of 40 percent by weight.

In a frothing apparatus (mixer) there is produced from the following aqueous liquor a dye froth having a frothing degree of 1:10:
  0.6 g of the dye of the formula (7) per liter,
  0.40 g of the dye of the formula (8) per liter,
  0.35 g of the dye mixture B from Example 1 per liter,
  2.5 g of a foam-stabilising mixture of coconut fatty acid-diethanolamide/nonylphenolpolyglycol(11) ether and sodium lauryltriglycol ether sulfate per liter,
  0.6 g of a siloxanoxyalkylene-copolymer of the formula

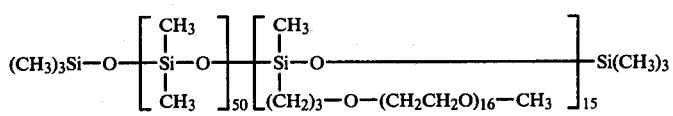

per liter, and 1 g of sodium acetate per liter, as well as acetic acid for adjusting the pH-value of the liquor to 6.0.

This froth is then applied from a froth container, which is provided with an adjustable doctor blade for obtaining the desired thickness of froth, by means of a chute onto the pile side of the carpet material passing through the dyeing plant (speed 9 m/minute). The coating thickness of froth is 8 mm, and the amount of froth applied is 135%. The carpet material subsequently passes through a vacuum passage in which, from the reverse side, the froth coating is partially sucked into the carpet (reduced pressure ~0.1 bar), in consequence of which the thickness of the froth layer is somewhat reduced. The carpet passes then over a transport roller into a steamer (102° C., saturated steam), where a slight foaming up and subsequent breaking down of the froth occurs. The carpet is afterwards sprayed with water at about 80° C.; it is then subjected to suction, and dried at 100° to 130° C. in a perforated cylinder dryer. The carpet material obtained is levelly dyed in a beige shade; there is excellent dye penetration, and the softness and fluffiness of the material are favourably affected by the froth dyeing process.

By using per liter 0.35 g of the blue dye mixture E or G, in place of 0.35 g of the blue dye mixture B per liter, with otherwise the same procedure, there are likewise obtained beige-coloured, level and non-streaky carpet dyeings.

What is claimed is:

1. A dye mixture which contains a dye of the formula

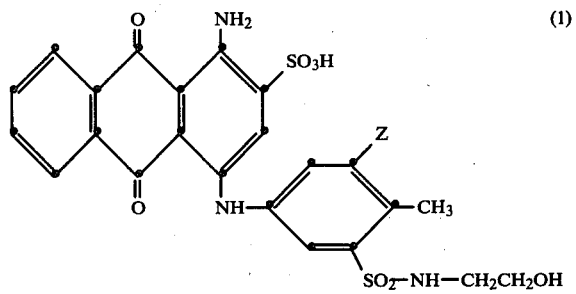

wherein Z is hydrogen or methyl, and a dye of the formula

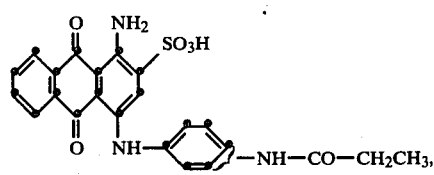

Z in the formula (1) being hydrogen when the propionylamino group in the formula (2) is bound in the m-position with respect to the NH group.

2. A dye mixture according to claim 1, which contains a dye of the formula

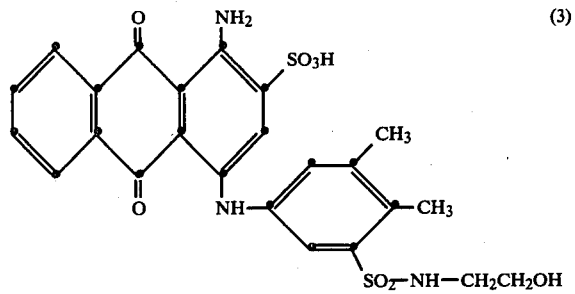

and a dye of the formula

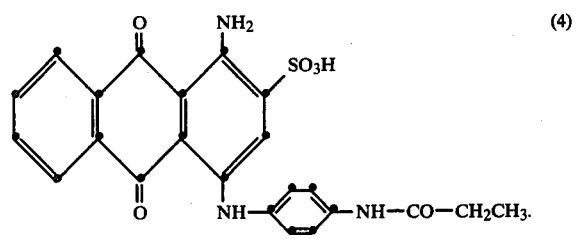

3. A dye mixture according to claim 1, which contains a dye of the formula

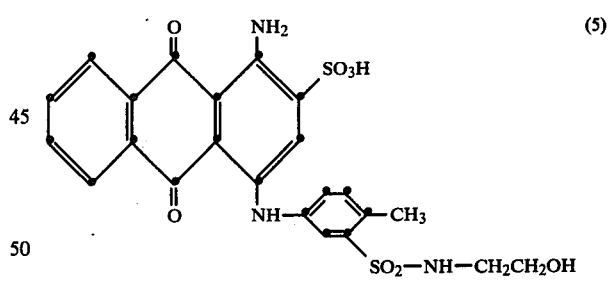

and a dye of the formula (2).

4. A dye mixture according to claim 3, which contains, as dye of the formula (2), a dye of the formula

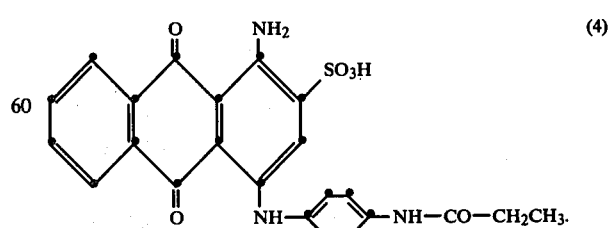

5. A dye mixture according to claim 3, which contains, as dye of the formula (2), a dye of the formula

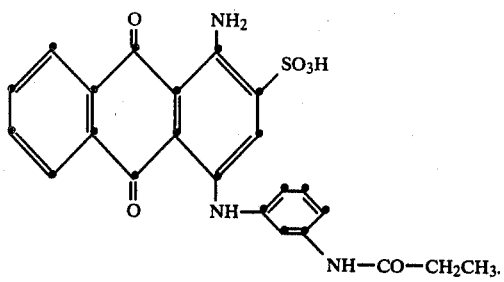
(6)

6. A dye mixture according to any one of claims 1 to 5, wherein the ratio between the dyes of the formulae (1) and (2), (3) and (4), (5) and (2), (5) and (4) or (5) and (6) is 20:80 to 80:20.

7. A dye mixture according to claim 6, wherein the ratio between the dyes of the formulae (3) and (4), (5) and (4) or (5) and (6) is 40:60 to 60:40.

8. A dye mixture according to claim 7, wherein the ratio between the dyes of the formulae (3) and (4), (5) and (4) or (5) and (6) is 50:50 to 60:40.

9. A process for dyeing and printing natural and synthetic polyamide materials with a dye mixture, wherein a dye mixture according to any one of claims 1 to 8 is used.

10. A process for dyeing and printing natural and synthetic polyamide materials by use of the dye mixture according to any one of claims 1 to 8 in combination with other dyes.

11. A process according to claim 10 for trichromatic dyeing or printing, wherein there is used a dye mixture according to any one of claims 1 to 8 in combination with at least one red dye and at least one yellow or orange dye.

12. The use of the dye mixture according to claim 1 for dyeing and printing.

13. A dyeing or printing composition containing a dye mixture according to any one of claims 1 to 8.

14. The material, preferably textile material, dyed or printed according to any one of claims 9 to 11 or 13.

* * * * *